United States Patent
Chen et al.

(10) Patent No.: US 8,371,735 B2
(45) Date of Patent: Feb. 12, 2013

(54) MULTI-LAYER LIGHT GUIDE APPARATUS

(75) Inventors: Yan Zuo Chen, Taoyuan County (TW); Chung-Hung Chien, Taoyuan County (TW); Wen-Feng Cheng, Taipei County (TW); Hao-Xiang Lin, Taoyuan County (TW)

(73) Assignee: Entire Technology Co., Ltd., Taoyuan County (TW)

( * ) Notice: Subject to any disclaimer, the term of this patent is extended or adjusted under 35 U.S.C. 154(b) by 252 days.

(21) Appl. No.: 12/875,599

(22) Filed: Sep. 3, 2010

(65) Prior Publication Data
US 2011/0255305 A1 Oct. 20, 2011

(30) Foreign Application Priority Data
Apr. 14, 2010 (TW) ................................ 99111637 A (51) Int. Cl.
*F21V 7/04* (2006.01)
*F21V 5/00* (2006.01)

(52) U.S. Cl. ........ 362/607; 362/619; 362/628; 362/332; 385/131; 385/901

(58) Field of Classification Search .................. 362/607, 362/608, 617, 619, 628, 330–332; 385/145, 385/43, 901, 129, 131
See application file for complete search history.

(56) References Cited

U.S. PATENT DOCUMENTS

| | | | |
|---|---|---|---|
| 4,737,896 A | | 4/1988 | Mochizuki et al. |
| 5,237,641 A | * | 8/1993 | Jacobson et al. ............... 385/146 |
| 5,528,720 A | * | 6/1996 | Winston et al. ............... 385/146 |
| 5,594,830 A | | 1/1997 | Winston et al. |
| 6,002,829 A | * | 12/1999 | Winston et al. ............... 385/146 |
| 6,172,809 B1 | * | 1/2001 | Koike et al. ............. 359/485.04 |
| 6,671,452 B2 | * | 12/2003 | Winston et al. ............... 385/146 |
| 6,993,242 B2 | * | 1/2006 | Winston et al. ............... 385/146 |
| 7,418,188 B2 | * | 8/2008 | Winston et al. ............... 385/146 |
| 7,424,197 B2 | * | 9/2008 | Winston et al. ............... 385/146 |
| 2006/0146573 A1 | | 7/2006 | Iwauchi et al. |

* cited by examiner

*Primary Examiner* — Thomas Sember
(74) *Attorney, Agent, or Firm* — Rosenberg, Klein & Lee (57) ABSTRACT

Provided is a multi-layer light guide apparatus. Various optical paths are formed as a light source emits light into the apparatus. Main structure of the apparatus includes a body and a micro-structured layer. The body has a first layer with first refractive index ($n_1$) and a second layer with second refractive index ($n_2$). The first layer has a first critical angle ($\theta_{C1}$). An interface critical angle ($\theta_{C12}$) is formed between the associated first layer and second layer. The light then outputs as the light propagates through the layers. The micro-structured layer is formed on a side of the body. It features:

$n_1 < n_2; 0 < |\theta_{C12} - \theta_{C1}| \leq 35°;$

A third layer with a third index of refraction ($n_3$) is further included. A second interface critical angle ($\theta_{C23}$) is formed between the second layer and the third layer. It features:

$n_1 < n_2 < n_3; \theta_{C23} > \theta_{C12}; 0 < |\theta_{C12} - \theta_{C1}| \leq 35°.$

10 Claims, 6 Drawing Sheets

MULTI-LAYER LIGHT GUIDE APPARATUS

BACKGROUND OF THE INVENTION

1. Field of the Invention

The present invention relates to a multi-layer light guide apparatus, more particularly to the light guide apparatus made of two or more layers light-guide materials, the apparatus provides better light output and less lost by arranging the layers from greater refractive index to smaller.

2. Description of Related Art

Light guide plate serves as a medium for guiding incident light into a display backlight module. Most backlight modules are the edge types. Through the light guide plate, the edge-lighting type backlight guides the lateral light out of the front surface of display, and therefore enhances the panel's luminance and average brightness.

The theory of the light-guide plate is to guide the incident light to the other end of the plate. In particular, a specific structure of one side of the light-guide plate causes light diffusion at various angles. Therefore, the incident light may be guided to output from the plate's front surface. The bigger refractive index allows the higher capability of the light guiding. Furthermore, the other paths of light may be guided into the light-guide plate with respect to a reflective plate on the bottom of the plate besides the front light.

Figure 1:
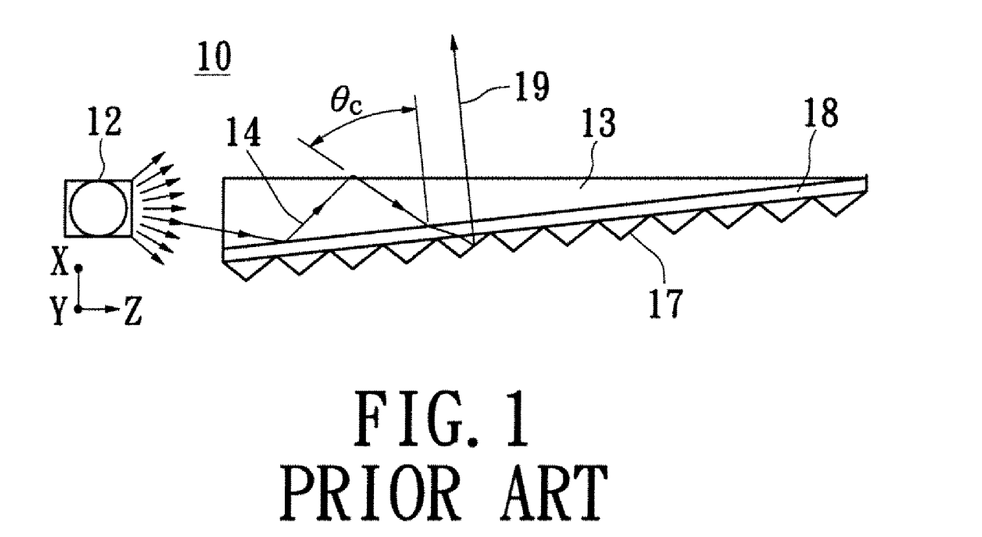
FIG. 1 shows a schematic diagram of a conventional light guide apparatus.

U.S. Pat. No. 5,594,830 introduces a double-layer light guide plate. Reference is made to FIG. 1 showing a schematic diagram of a wedge-shaped optical device.

A wedge-shaped optical device 10 is shown. Main structure thereof is composed of a wedge layer 13, a transparent layer 18 and a structural layer 17 adhered thereto. A light from the source 12 reaches a lateral side. This type of light source 12 entering the wedge-shaped optical device 10 may often be a pipe-shaped device.

The material of the wedge-shaped optical device 10 results in a critical angle $\theta_C$ which results in a full reflection. The light firstly enters a wedge layer 13 of the light-guide device 10, and forms a light path 14. The light then propagates into the structural layer 17 through a transparent layer 18. Full reflection is formed on the surface of structural layer 17. The light then propagates to the structural layer 17 through the transparent layer 18. After process of refraction and reflection, an emitting light 19 is formed after out of the wedge-shaped light-guide device 10.

Nevertheless, the critical angle for each layer of the light guide device may be changed between the two layers. Therefore, conventional device causes energy loss of the up-refractive light due to defective design. For example, a full reflection may be caused at a certain angle and stop the light out of the device.

SUMMARY OF THE INVENTION

To improve the light loss subjected to the change of critical angle between the layers of the conventional double-layer light guide device, a multi-layer light guide apparatus is provided in the present invention. The apparatus is composed of two or more layers light-guide materials. Further, the layers have different refractive indexes ranged from large to small so as to advantage the apparatus better light output ratio and less light loss rate.

In accordance with one of the embodiments of the present invention, a normal line is firstly defined in each layer of the multi-layer light guide apparatus. As the apparatus receives a light from a light source, a plurality of optical paths are formed in the multi-layer light guide apparatus. A critical angle of each layer and an interface critical angle are then defined with respect to the normal line.

The multi-layer light guide apparatus essentially includes a body and the micro-structured layer. The body preferably has a first light-guide layer and a second light-guide layer, which are respectively has a first refractive index ($n_1$) and a second refractive index ($n_2$). In particular, the first refractive index is smaller than the second refractive index.

A light incident surface is defined along a side of the body. A light source emits a light into the light incident surface, and simultaneously into the first light-guide layer and the second light-guide layer. A light emission surface is then defined on the front side of the body, namely the surface of the first light-guide layer. The incident light is outputted from this light emission surface.

The micro-structured layer is formed on the surface opposite to the second light-guide layer. When any light enters the micro-structured layer, the light may be guided out from the light guide apparatus after refraction and full reflection.

When the light propagates through the first light-guide layer and the second light-guide layer, a first interface critical angle ($\theta_{C12}$) between the two layers can be:

$$\theta_{C12} = \sin^{-1}\left(\frac{n_1}{n_2}\right).$$

When the light passes through the first light-guide layer, a first critical angle ($\theta_{C1}$) is formed opposite to a normal light of the first light-guide layer. This first critical angle ($\theta_{C1}$):

$$\theta_{C1} = \sin^{-1}\left(\frac{1}{n_1}\right).$$

In particular, the first critical angle and the first interface critical angle are formulated as:

$$0 < |\theta_{C12} - \theta_{C1}| \leq 35°.$$

The multi-layer light guide apparatus in accordance with one further embodiment includes three layers. The body has a first light-guide layer, a second light-guide layer, and a third light-guide layer. The layers are respectively with a first refractive index ($n_1$), a second refractive index ($n_2$), and a third refractive index ($n_3$).

It is featured that the first refractive index is smaller than the second refractive index, and the third refractive index is smaller than the second refractive index. The light emitted from the light source simultaneously enters the first light-guide layer, the second light-guide layer, and the third light-guide layer.

In particular, the micro-structured layer is formed on the surface of the third light-guide layer, and be opposite to the side of the light emission surface. A second interface critical angle ($\theta_{C23}$) is formed between the second light-guide layer and the third light-guide layer, and this second interface critical angle is:

$$\theta_{C23} = \sin^{-1}\left(\frac{n_2}{n_3}\right).$$

It is worth noting that the first interface critical angle between the first light-guide layer and the second light-guide layer:

$$\theta_{C12} = \sin^{-1}\left(\frac{n_1}{n_2}\right).$$

In the embodiment, the relationship among the first critical angle, the first interface critical angle and the second interface critical angle can be:

$$\theta_{C23} > \theta_{C12}; 0 < |\theta_{C12} - \theta_{C1}| \leq 35°.$$

These and other various advantages and features of the instant disclosure will become apparent from the following description and claims, in conjunction with the appended drawings.

DESCRIPTION OF THE PREFERRED EMBODIMENTS

The instant disclosure provides a light guide design with multiple layers. According to one of the embodiments, the light guide apparatus at least has two layers. In particular, the layers have different refractive indexes. Because of the design of each layer's refractive index, the multi-layer light guide apparatus in accordance with the invention can minimize the light loss, as well as increase the efficiency of the light emission surface about 10% to 20%.

First Embodiment

Figure 2:
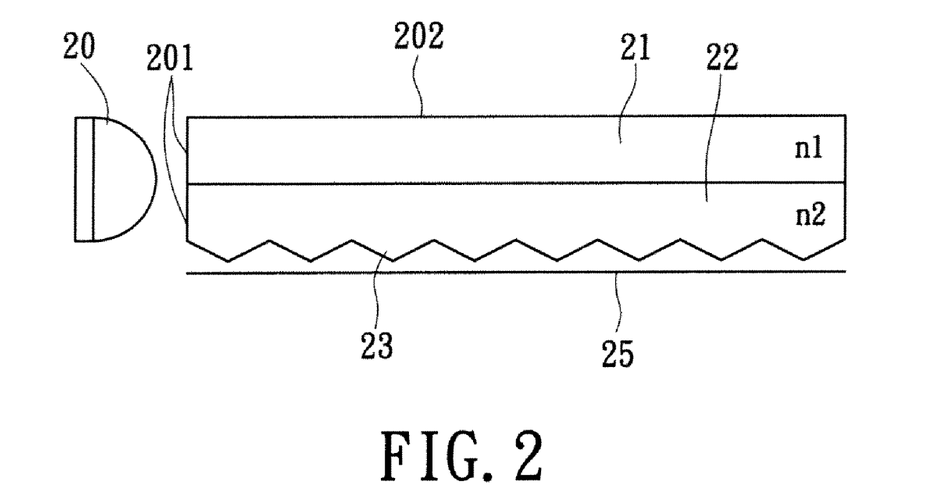
FIG. 2 shows a cross-sectional view of a multi-layer light guide apparatus in accordance with the present invention.

Reference is made to FIG. 2 illustrating a cross-sectional diagram of the light guide apparatus. The body of the apparatus has a first light-guide layer 21 and a second light-guide layer 22, which respectively have a first refractive index $n_1$ and a second refractive index $n_2$. A light source 20 emits a light into the first light-guide layer 21 and the second light-guide layer 22 simultaneously through a light incident surface 201 of the apparatus. The incident light can be divided as one upward deflective light and other downward deflective light. The surface of the multi-layer light guide apparatus is the surface of the first light-guide layer 21, and also the surface of the light emission surface 202. The incident light is refracted and reflected in the apparatus, and outputted from the light emission surface 202. In which, an angle is formed between the light incident surface 201 and the light emission surface 202. This angle may be vertical, or any other non-vertical form in compliance with requirements.

In particular, there is a micro-structured layer 23 formed on the surface of the second light-guide layer 22. In accordance with the present invention, the micro-structured layer 23 is manufactured on the surface by means of a continuous multiple-layer co-extrusion process. The micro-structured layer 23 is formed on a reflecting surface 25 of one side of the light guide apparatus. When the light propagates to the micro-structured layer 23, the light will be transferred back to the light guide apparatus from the reflecting surface 25 by light scattering or reflection.

The composition of the multi-layer light guide apparatus at least includes two layers with transparent materials. The layers refractive indexes are fulfilled with an arrangement, namely the first refractive index is smaller than the second refractive index ($n_1 < n_2$).

Figure 3:
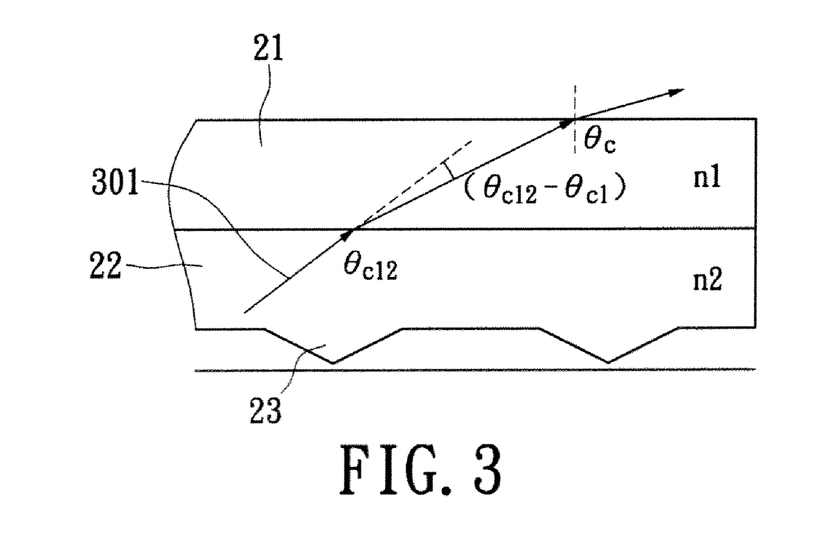
FIG. 3 is a diagram showing the critical angles for each layer of the multi-layer light guide apparatus in accordance with the present invention.

FIG. 3 illustrates the relationship among the critical angles of the light guide apparatus and their interfaces there-between, especially the optical paths as the light enters the multi-layer light guide apparatus. While the light enters the apparatus, the incident light forms a plurality of optical paths in the apparatus. Normal lines are defined in the layers. The angles of the incident lights and those critical angles are defined with respect to the normal lines.

The body of the apparatus shown in FIG. 3, in view of FIG. 2, has a first light-guide layer 21 and the second light-guide layer 22, which respectively have the first refractive index ($n_1$) and the second refractive index ($n_2$). In one embodiment, the micro-structured layer 23 is formed at one side of the second light-guide layer 22.

As the light enters the body through the incident surface, the light enters from the left side of the body, for example, and simultaneously into both the first light-guide layer 21 and the second light-guide layer 22. The optical path 301 represents the path as the light enters the body in the above example.

Furthermore, since the first light-guide layer 21 has its own refractive index, a first critical angle $\theta_{C1}$ is formed as the light meets the layer's surface. If the incident angle is bigger than this first critical angle $\theta_{C1}$, the light is totally reflected. On the other hand, the second light-guide layer 22 has a second critical angle $\theta_{C2}$.

An interface effect cause the interface between the first light-guide layer 21 and the second light-guide layer 22 has a first interface critical angle $\theta_{C12}$. As shown, the related optical path 301 shows the light being fully reflected or refracted via the interface between the layers 21, 22. Further, the light along the optical path 301 reaches the first light-guide layer 21 from the second light-guide layer 22. The light is then deflected after refraction with respect to the interface. The angle of deflection can be limited to $\theta_{C12} - \theta_{C1}$. The deflected light is then outputted from the surface of the first light-guide layer 21. The first interface critical angle $\theta_{C12}$ can be described as:

$$\theta_{C12} = \sin^{-1}\left(\frac{n_1}{n_2}\right).$$

In accordance with the embodiment of the present invention, a better light output rate may be obtained as a difference between the first interface critical angle $\theta_{C12}$ and the first critical angle $\theta_{C1}$ isn't larger than 35 degrees, namely it may minimize the light loss to lowest level.

The relationship of the first refractive index smaller than the second refractive index shows that the first critical angle $\theta_{C1}$ is larger than the second critical angle $\theta_{C2}$, and the upward deflective light may output through the light emission surface. Therefore, the design of the difference allows minimizing the possibility of full reflection to increase the efficiency of outputting from the light emission surface. On the other hand, the downward deflective light may not have full reflection. Further, the light passing through the micro-structured layer 23 can be deflected out to the light emission surface after its full reflection situation may be destroyed. However the portion of the downward deflective light not passing through the micro-structured may be reflected out to the light emission surface with the same angle because of the full reflection.

In an exemplary example, when the light enters the body of the light guide, a first optical path and a second optical path, which are respectively the downward and upward deflective lights, are formed.

The downward deflective light, along the first optical path, propagates to the micro-structured layer and forms a third optical path. When these optical paths are formed as the light meets the layers or interfaces, the related critical angles dominate the refractions or full reflections. For example, when the upward deflective light, along the second optical path, meets the interface between the first light-guide layer and the second light-guide layer, an angle is formed with respect to the normal line of the first light-guide layer. The first interface critical angle ($\theta_{C12}$) determines the light is refracted or fully reflected. In one preferred embodiment, this angle may be equal to or small than the first interface critical angle for proper light refraction.

Next, the light along the second optical path propagates through the first light-guide layer, and forms an angle with respect to the normal line of the first light-guide layer. This angle is preferably equal to or smaller than the first critical angle ($\theta_{C1}$) for proper output after refraction. The first critical angle can be described as:

$$\theta_{C1} = \sin^{-1}\left(\frac{1}{n_1}\right).$$

According to one of the embodiments, the first critical angel and the first interface critical angle are formulated as:

$$0 < |\theta_{C12} - \theta_{C1}| \leq 35°.$$

When the light along the third optical path reaches the micro-structured layer and meets the refractions and reflections, and then outputs with the light along the second optical path from the light emission surface.

The multi-layer light guide apparatus in accordance with the present invention allows the incident light to form several optical paths in the apparatus, and then outputs from the light emission surface after effective refractions. With respect to the two-layer structure, the refractive index ($n_1$) of first light-guide layer and the refractive index ($n_2$) of the second light-guide layer are featured as $n_1 < n_2$. In particular, the difference of the two refractive indexes is preferably ranged over 0.04 to 0.14. The first interface critical angle ($\theta_{C12}$) between the two layers and the first critical angle ($\theta_{C1}$) of the first light-guide layer can fulfill:

$$0 < |\theta_{C12} - \theta_{C1}| \leq 35°.$$

Second Embodiment

Figure 4:
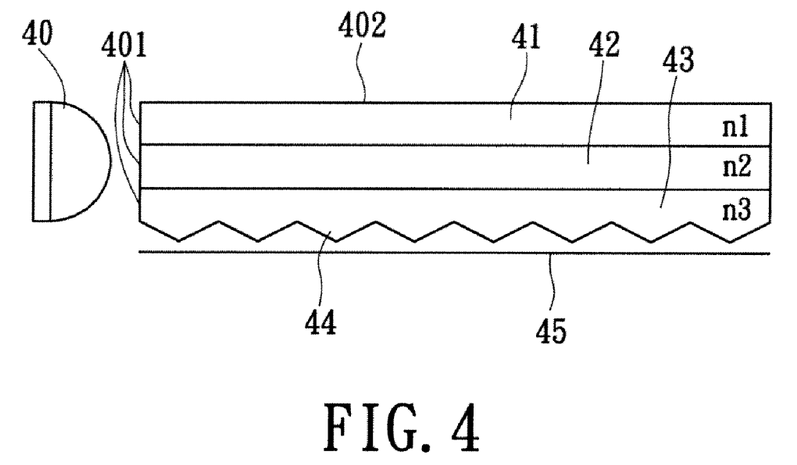
FIG. 4 shows a cross-sectional view of the multi-layer light guide apparatus of one embodiment in accordance with present invention.

FIG. 4 schematically shows a cross-sectional view of the multi-layer light guide apparatus with three layers.

The multi-layer light guide apparatus essentially includes a body with multiple layers and a micro-structured layer. The body includes a first light-guide layer 41, a second light-guide layer 42 and a third light-guide layer 43. These layers 41, 42 and 43 respectively have a first refractive index $n_1$, a second refractive index $n_2$, and a third refractive index $n_3$. The following angular relations are defined with respect to each layer's normal line.

A light source 40 emits a light into the first light-guide layer 41, the second light-guide layer 42, and the third light-guide layer 43 through a light incident surface 401 simultaneously. The incident light may be divided into a downward deflective light and an upward deflective light. The downward deflective light may be refracted and reflected as meeting the micro-structured layer 44. The light then outputs from a light emission surface 402.

In one of the embodiments, the light meeting the micro-structured layer 44 may be scattered or reflected output to the light emission surface 402 with respect to an external reflecting surface 45.

The light emission surface 402 is preferably the surface of the first light-guide layer 41 of the apparatus. The micro-structured layer 44 is formed at one side of the third light-guide layer 43. This structure may be manufactured by a continuous co-extrusion process for the structure having multiple layers. According to one of the embodiments, the first refractive index is smaller than the second refractive index, and the second refractive index is smaller than the third refractive index, that is $n_1 < n_2 < n_3$.

In particular, the light meets one side of the light incident surface, and into the layers. In the meantime, the first optical path and the second optical path are formed. The paths can be divided into a downward deflective light and an upward deflective light. The downward light along the first optical path propagates to the structural layer and forms the third optical path.

In which, a first interface critical angle ($\theta_{C12}$) is formed between the first light-guide layer and the second light-guide layer. When the upward light, along the second optical path, propagates through the first light-guide layer and the second light-guide layer, any angle equal to or smaller than the first interface critical angle may successfully be refracted. To the above implementation, most of the lights may be refracted out, and the light loss can be minimized. The first interface critical angle can be described as:

$$\theta_{C12} = \sin^{-1}\left(\frac{n_1}{n_2}\right).$$

Furthermore, a second interface critical angle ($\theta_{C23}$) is formed between the second light-guide layer and the third light-guide layer. When the light, along the second optical path, passes through both the second light-guide layer and the third light-guide layer, the light may be successfully refracted out if its angle is equal to or smaller than the second interface critical angle. The second interface critical angle can be described as:

$$\theta_{C23} = \sin^{-1}\left(\frac{n_2}{n_3}\right).$$

The first light-guide layer has a first critical angle ($\theta_{C1}$). When the light along the second optical path passes through the first light-guide layer, the light may output from the light emission surface if the incident angle is equal to or smaller than the first critical angle. The first critical angle can be defined as:

$$\theta_{C1} = s^{-1}\left(\frac{1}{n_1}\right).$$

According to the multi-layer light guide apparatus in accordance with the present invention, it is featured that the first interface critical angle is smaller than the second interface critical angle, and the difference between the first interface critical angle and the first critical angle may not larger than 35 degrees. The related relationship can be described as follows:

$$\theta_{C23} > \theta_{C12}; 0 < |\theta_{C12} - \theta_{C1}| \leq 35°.$$

Figure 5:
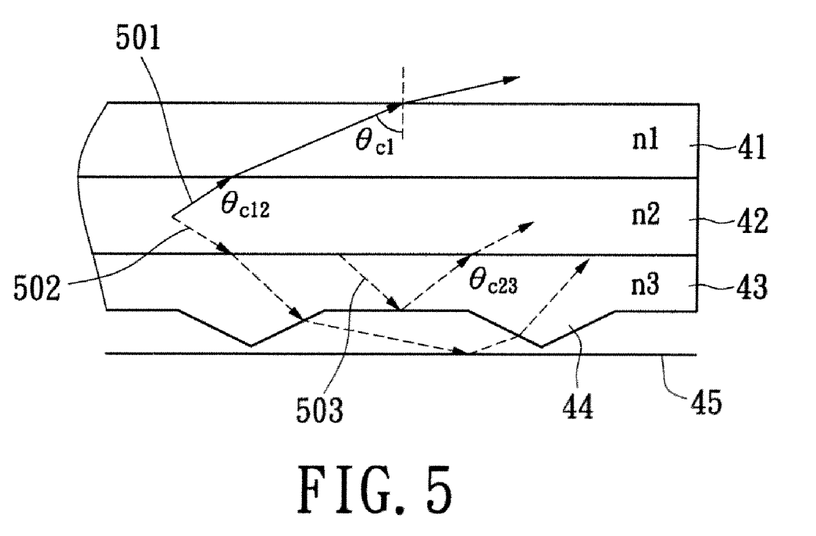
FIG. 5 depicts the angular relationship of each layer of the multi-layer light guide apparatus in accordance with the present invention.

Reference is made to FIG. 5. A light from the light source enters the apparatus from the left side, and be divided into an upward deflective light and a downward deflective light. The optical path 501 represents the upward deflective light, which passes through the interface between the first light-guide layer 41 and the second light-guide layer 42. The first interface critical angle ($\theta_{C12}$) is formed with respect to this interface. After once refraction, the light meets the surface of the first light-guide layer 41. The first critical angle ($\theta_{C1}$) is formed on this surface. If the incident angle is not larger than the first critical angle, the light can successfully output from the light emission surface.

The optical path 502 particularly represents the downward deflective light. This deflective light is refracted with respect to the interface between the second light-guide layer 42 and the third light-guide layer 43. After that, the light then reaches the micro-structured layer 44, and be refracted out with respect to the surface of the micro-structured layer 44. Next, the light is reflected with respect to the reflecting surface 45 and enters the light guide apparatus. Meanwhile, the light enters the light guide apparatus through the micro-structured layer 44, and be refracted out through the layers of the apparatus.

In the diagram, the optical path 503 represents the light propagating in the third light-guide layer 43, but not into the micro-structured layer 44. In this case, the light is fully reflected with respect to the surface of the third light-guide layer 43, and refracted with respect to the interface with critical angle $\theta_{C23}$ between the second light-guide layer 42 and the third light-guide layer 43. After that, the light then enters the second light-guide layer 42.

Data in Experiment:

Table 1 shows the performances of light transmission rate between the two-layer and three-layer light guide apparatus in accordance with the present invention.

According to the data shown in the Table 1, the refractive indexes of the layers in the two-layer structure are respectively 1.52 for the first layer and 1.58 for the second layer. The transmission rate is 98.6% as the incident angle is 65 degrees. The transmission rate is 94.7% as the angle is 70 degrees. The transmission rate is merely 44% as the angle reaches 74 degrees.

The refractive indexes of the layers in the three-layer structure are respectively 1.52, 1.55 and 1.58. This three-layer structure provides better performances under the same conditions with the two-layer structure.

TABLE 1

| | transmission rate | | | |
|---|---|---|---|---|
| θ (°) | 65 | 70 | 73 | 74 |
| Two layers (1.52-1.58) Transmission rate (%) | 98.6 | 94.7 | 79.1 | 44 |
| Three layers (1.52-1.55-1.58) Transmission rate (%) | 99.7 | 99.2 | 98.1 | 97.3 |

Table 2 shows the relationship of the refractive indexes of the two-layer and the three-layer structure.

According to the experiment, the light output rate is 70.5% and the light loss is 29.5% as the refractive indexes are respectively 1.52 and 1.58 for two-layer structure ($n1<n2$). However, the three-layer structure provides better light output rate and less light loss, in comparison with the two-layer structure, while the refractive indexes are 1.52, 1.55 and 1.58 ($n_1 < n_2 < n_3$).

TABLE 2

| | refractive index | | | |
|---|---|---|---|---|
| Layers | refractive index | refractive index | Light output (%) | Light loss (%) |
| 2 | $n_1 > n_2$ | 1.58-1.52 | 58.3 | 41.7 |
| | $n_1 < n_2$ | 1.52-1.58 | *70.5 | 29.5 |
| 3 | $n_1 > n_3 > n_2$ | 1.58-1.52-1.55 | 64.4 | 35.6 |
| | $n_3 > n_1 > n_2$ | 1.55-1.52-1.58 | 67.9 | 32.1 |
| | $n_1 < n_2 < n_3$ | 1.52-1.55-1.58 | *75.1 | 24.9 |

Table 3 shows the relationship of the critical angles is angular degree) of the layers in the two-layer light guide apparatus.

The total thickness of the substrate is 3.0 mm, and there are two layers. Each layer has thickness 1.5 mm. The refractive indexes are limited to $n_1 < n_2$. The light output rate is calculated by obtaining the Lumen of output of the light guide apparatus. According to the experiment, the apparatus provides better performance since it is limited to $$0 < |\theta_{C12} - \theta_{C1}| \leq 35°.$$

TABLE 3

| | critical angles of two-layer structure | | | | |
|---|---|---|---|---|---|
| Layers | refractive index | $\theta_{C1}$ | $\theta_{C12}$ | $\theta_{C12} - \theta_{C1}$ | Light output (%) | Light loss (%) |
| 2 | 1.48-1.56 | 42.51 | 71.57 | 29.06 | *77.2 | 22.8 |
| | 1.50-1.56 | 41.81 | 74.06 | 32.25 | *75.9 | 24.1 |
| | 1.52-1.56 | 41.14 | 77.0 | 35.86 | *71.3 | 28.7 |
| | 1.54-1.56 | 40.49 | 80.81 | 40.32 | 66.8 | 33.2 |
| | 1.48-1.58 | 42.51 | 69.51 | 27.0 | *75.1 | 24.9 |
| | 1.50-1.58 | 41.81 | 71.69 | 29.88 | *73.7 | 26.3 |
| | 1.52-1.58 | 41.14 | 74.16 | 33.02 | *70.5 | 29.5 |
| | 1.54-1.58 | 40.49 | 77.08 | 36.59 | 67.8 | 32.2 |
| | 1.56-1.58 | 39.87 | 80.87 | 41.0 | 65.2 | 34.8 |
| | 1.48-1.62 | 42.51 | 66.0 | 23.49 | *78.6 | 21.4 |
| | 1.50-1.62 | 41.81 | 67.81 | 26.0 | *75.5 | 24.5 |
| | 1.52-1.62 | 41.14 | 69.76 | 28.62 | *72.2 | 27.8 |
| | 1.54-1.62 | 40.49 | 71.92 | 31.43 | *71.8 | 28.2 |
| | 1.56-1.62 | 39.87 | 74.36 | 34.49 | *70.3 | 29.7 |
| | 1.58-1.62 | 39.26 | 77.24 | 37.98 | 68.4 | 31.6 |

Table 4 shows the relationship of the critical angles of the three layers in the light-guide apparatus. The total thickness of the substrate is 3.0 mm, and has three layers. In which, the relationship of the refractive indexes appear $n_1<n_2<n_3$. The layers respectively have the thicknesses 1.0 mm-1.0 mm-1.0 mm. It is noted that the calculation of the light output rate is based on the value of Lumen generated from the light guide apparatus.

According to experiment with regard to the refractive index, the light guide may obtain better light output rate and lower light loss when the value of $\theta_{C12}-\theta_{C1}$ is around 35 or smaller than 35.

TABLE 4 critical angles of three-layer structure

| Layers | refractive index | $\theta_{C1}$ | $\theta_{C12}$ | $\theta_{C12}-\theta_{C1}$ | $\theta_{C23}$ | Light output (%) | Light loss (%) |
|---|---|---|---|---|---|---|---|
| 3 | 1.48-1.50-1.62 | 42.51 | 80.63 | 38.12 | 67.81 | 68.7 | 31.3 |
|   | 1.48-1.52-1.62 | 42.51 | 76.82 | 34.31 | 69.76 | *70.5 | 29.5 |
|   | 1.48-1.54-1.62 | 42.51 | 73.95 | 31.44 | 71.92 | *71.8 | 28.2 |
|   | 1.48-1.56-1.62 | 42.51 | 71.57 | 29.06 | 74.36 | *76.2 | 23.8 |
|   | 1.48-1.58-1.62 | 42.51 | 69.5 | 27.0 | 77.24 | *77.5 | 22.5 |
|   | 1.48-1.6-1.62 | 42.51 | 67.67 | 25.16 | 80.99 | *81.4 | 18.6 |

TABLE 5 thicknesses of two-layer structure

| Layers | Thickness t1-t2(mm) | t1/t2 | Light output (%) | Light loss (%) |
|---|---|---|---|---|
| 2 | 0.01-2.99 | 0.00 | 66.7 | 33.3 |
|   | 0.02-2.98 | 0.01 | 67.2 | 32.8 |
|   | 0.03-2.97 | 0.01 | *71.1 | 28.9 |
|   | 0.04-2.96 | 0.01 | *74.3 | 25.7 |
|   | 0.05-2.95 | 0.02 | *79.6 | 20.4 |
|   | 0.1-2.9 | 0.03 | *78.9 | 21.1 |
|   | 0.5-2.5 | 0.20 | *76.8 | 23.2 |
|   | 1.0-2.0 | 0.50 | *72.6 | 27.4 |
|   | 1.5-1.5 | 1.00 | *70.3 | 29.7 |
|   | 2.0-1.0 | 2.00 | 60.5 | 39.5 |
|   | 2.5-0.5 | 5.00 | 55.1 | 44.9 |

With respect to the preferred ranges of the refractive indexes, references are made to Tables 3, 4 and 5. The ratio of the thicknesses between the first light-guide layer and the second light-guide layer may range over 0.01 to 1, and the apparatus can provide a preferred light output rate. Further, the difference of refractive indexes between the second refractive index and the first refractive index may in the midst of 0.04 and 0.14. Still further, the difference of refractive indexes between the second and the third refractive indexes may range between 0.02 and 0.1, and the apparatus can provide better light output rate.

Figure 6:
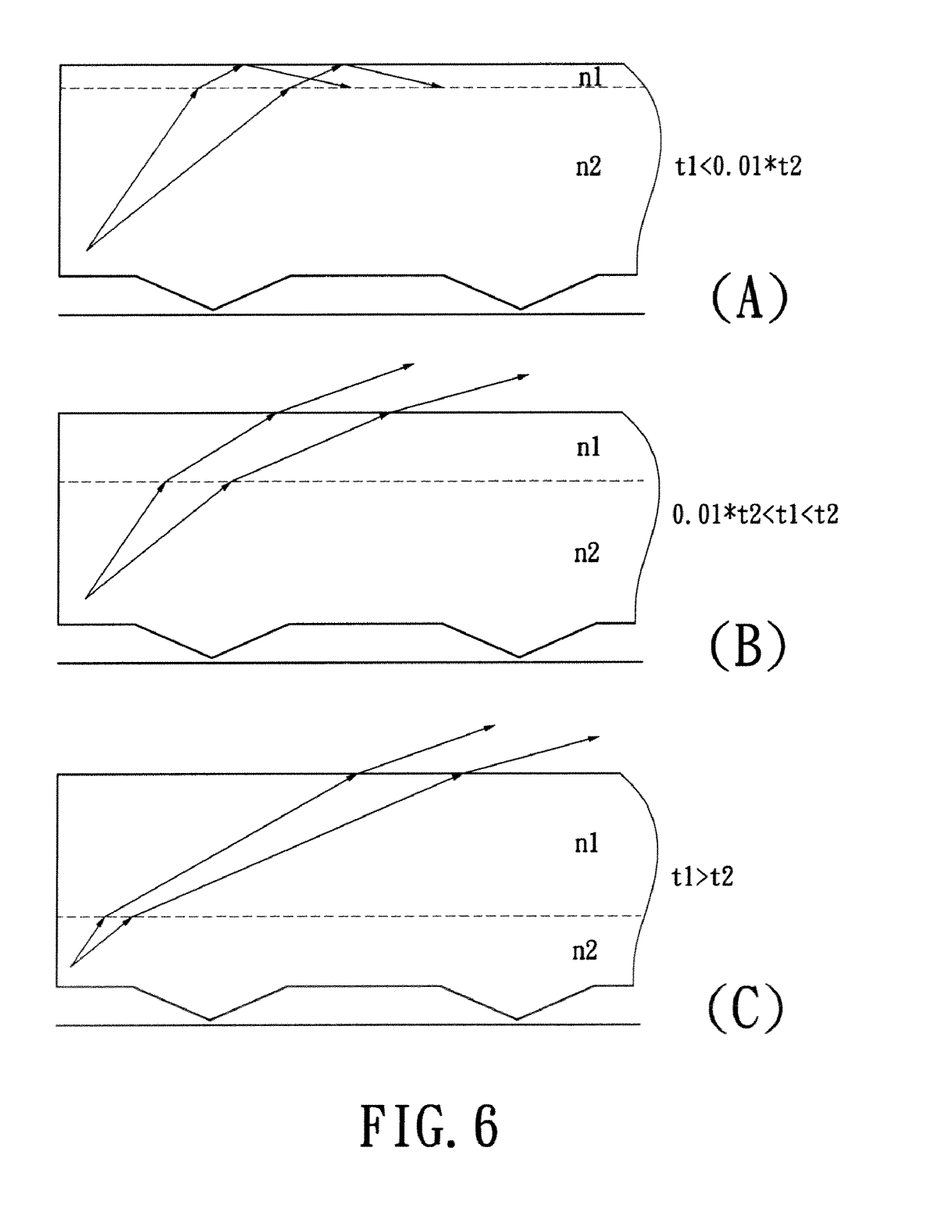
FIG. 6 schematically illustrates the claimed multi-layer light guide apparatus having layers with different thicknesses in accordance with the present invention.

FIG. 6 schematically describes the two-layer light guide apparatus with different thicknesses. The total thickness of the substrate is 3.0 mm, and it has two layers, which have respective refractive indexes 1.52 and 1.58. Units of the thicknesses t1 for the first light-guide layer and t2 for the second light-guide layer are millimeter (mm). Table 5 shows the variations of the thicknesses, and also the light output rates of the light guide apparatus calculated by Lumen for each application.

FIG. 6(A) describes the relationship of t1<0.01*t2. Since the thickness t1 is much smaller than t2, the full reflection occurs between the first and second layers, and the apparatus may not have better light output rate.

FIG. 6(B) describes the relationship of 0.01*t2<µl<t2. The thickness (t1) is between 0.01*t2 and t2. According to Table 5, if the thicknesses t1 and t2 are respectively 0.03 mm and 2.97 mm, the apparatus may achieve light output rate 71.1%.

FIG. 6(C) describes the relationship of t1>t2. The light may have longer transmission length in this case, and it enlarges the incident angle and causes unexpected full reflection. Therefore, the light output rate decreases.

According to the data shown in Table 5, it is a two-layer light guide apparatus. If the average thickness (t2) of the second light-guide layer including the micro-structured layer is larger than the thickness (t1) of the first light-guide layer, the apparatus provides a better light output rate. Exemplarily, the thickness (t1) of the first light-guide layer and the thickness (t2) of the second light-guide layer are ranged over 0.01 to 1.

Figure 7:
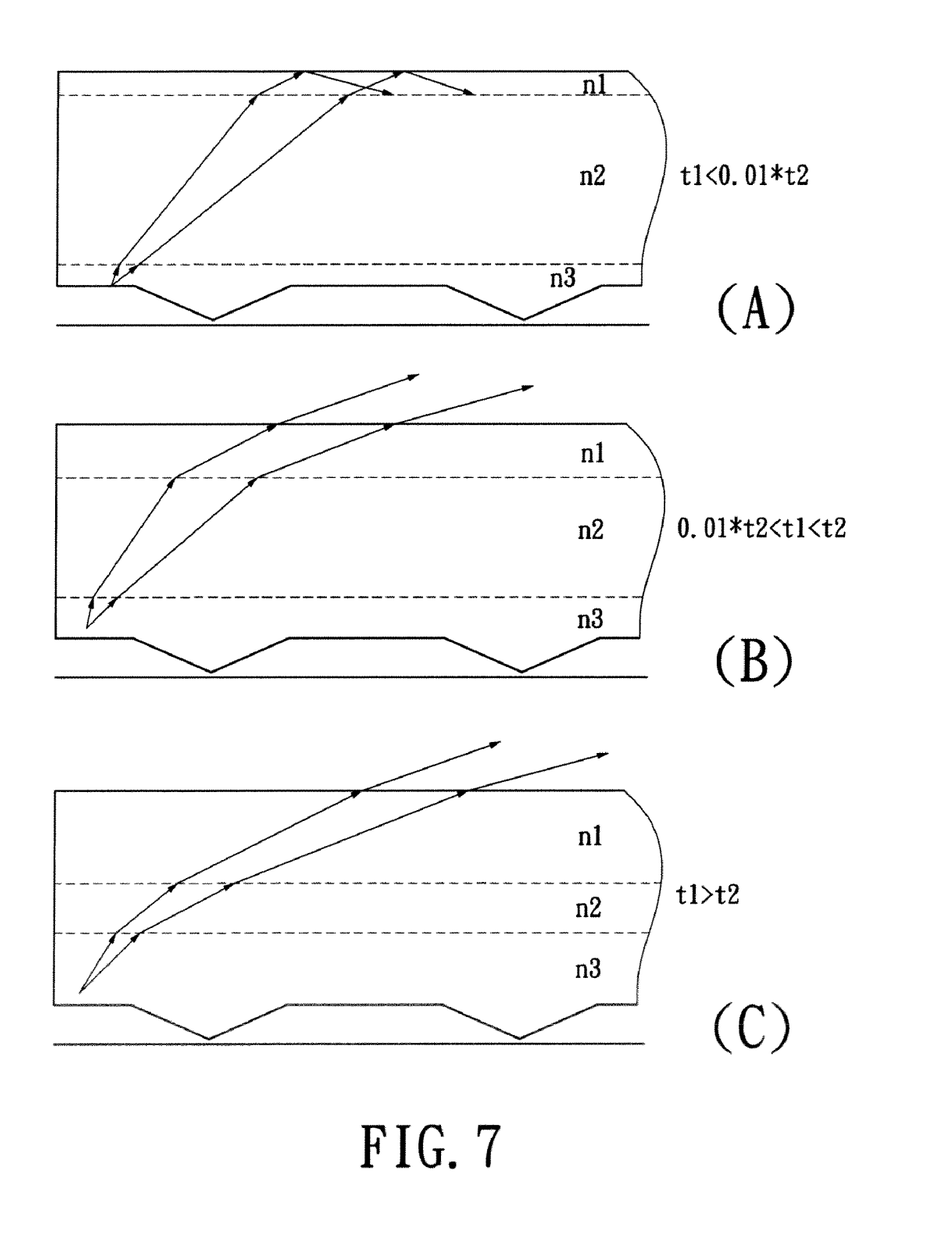
FIG. 7 schematically shows the claimed light guide apparatus having three layers with different thicknesses in accordance with the present invention.

Reference is made to FIG. 7, which schematically describes the three-layer light guide apparatus, which has variant thicknesses of the layers, wherein:

FIG. 7(A) describes a condition of t1<0.01*t2. In this case, the first light-guide layer and the third light-guide layer have the same (or similar) thickness, and the thicknesses (t1) of both layers are much smaller than the thickness of the second light-guide layer.

FIG. 7(B) describes a condition of 0.01*t2<µl<t2, that means the first light-guide layer and the third light-guide layer have the same thickness (t1), and this thickness (t1) is between t2 and 0.01*t2.

FIG. 7(C) describes a condition of t1>t2, that means the thicknesses (t1) of the first light-guide layer and the third light-guide layer are larger than the thickness (t2) of second light-guide layer.

TABLE 6 thicknesses of three-layer structure

| Layers | Thickness t1-t2-t1(mm) | t1/t2 | Output rate (%) | Loss (%) |
|---|---|---|---|---|
| 3 | 1.25-0.5-1.25 | 2.50 | 68.5 | 31.5 |
|   | 1.1-0.8-1.1 | 1.38 | *70.4 | 29.6 |
|   | 1.0-1.0-1.0 | 1.00 | *75.1 | 24.9 |
|   | 0.9-1.2-0.9 | 0.75 | *75.3 | 24.7 |
|   | 0.75-1.5-0.75 | 0.50 | *76.1 | 23.9 |
|   | 0.5-2.0-0.5 | 0.25 | *77.3 | 22.7 |
|   | 0.25-2.5-0.25 | 0.10 | *78.2 | 21.8 |
|   | 0.05-2.9-0.05 | 0.02 | *75.8 | 24.2 |
|   | 0.04-2.92-0.04 | 0.01 | *72.6 | 27.4 |
|   | 0.03-2.94-0.03 | 0.01 | *70.2 | 29.8 |
|   | 0.02-2.96-0.02 | 0.01 | 68.4 | 31.6 |
|   | 0.01-2.98-0.01 | 0.00 | 65.1 | 34.9 |

Figure 8:
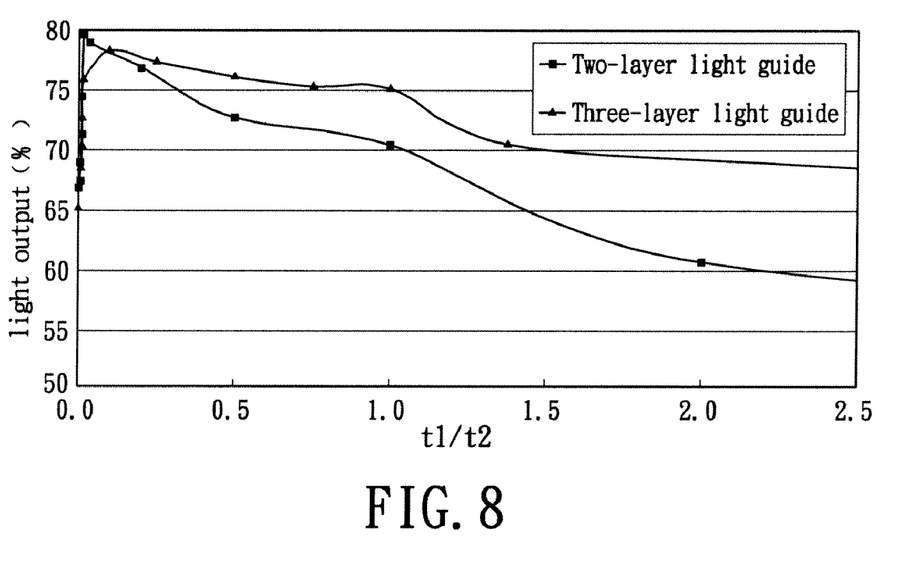
FIG. 8 shows a curve relationship between the thickness rate and light output in accordance with the present invention.

In reference with the curve depicted in FIG. 8, it is a two-layer structure. The average thickness of the second light-guide layer (t2) is larger than the thickness Op of the first light-guide layer. That is, when the value of t1/t2 is smaller than or equal to 1, the light guide provide a better light output rate which is larger than 70%, and the value ranges over 0.01 to 1.

With regard to three-layer light guide apparatus, the average thickness (t2) of the second light-guide layer is preferably bigger than the thickness (t1) of the first light-guide layer. That is, it may obtain a better light output rate as t1/t2 is smaller than or equal to 1.

However, references are made to the curve shown in FIG. 8 and the data in table 6. An average of thickness (t2) of the second light-guide layer is preferably smaller than the thickness (t1) of the first light-guide layer. It may obtain a better light output rate (preferably bigger than 70%) under a specific rate of the thicknesses. According to the current embodiment, t1/t2 falls within 0.01 to 1.5 for better light output rate.

The above described data and the implementations may refer to the materials and refractive indexes, as follows:

| Material | refractive index |
|---|---|
| (COP), UV RESIN | 1.52 |
| MS = methyl methacrylate (MMA) + styrene(SM) | 1.56 |
| PC(Polycarbonate) PS (Polystyrene) | 1.58 |
| PET(Polyethylene terephthalate) | 1.62 |
| PEN(polyethylene Naphthalate) | |
| TAC(Triacetyl Cellulose Film) | |

To sum up the above description, the light-guide apparatus having two or three transparent layers accomplishes a light guide with high output rate and low light loss by applying the optimization of refractive index and critical angle.

While the above description constitutes the preferred embodiment of the instant disclosure, it should be appreciated that the invention may be modified without departing from the proper scope or fair meaning of the accompanying claims. Various other advantages of the instant disclosure will become apparent to those skilled in the art after having the benefit of studying the foregoing text and drawings taken in conjunction with the following claims.

What is claimed is:

1. A multi-layer light guide apparatus receiving light from a light source, and a plurality optical paths are formed within the multi-layer light guide apparatus, each layer has a normal line, the apparatus comprising:
    a body having at least a first light-guide layer and a second light-guide layer, and the first light-guide layer has a first refractive index ($n_1$) and the second light-guide layer has a second refractive index ($n_2$), wherein the first refractive index is smaller than the second refractive index;
    a light incident surface being one side of the body, the light emitted from the light source simultaneously enters the first light-guide layer and the second light-guide layer from the light incident surface, and generating a first optical path and a second optical path;
    a light emission surface being a surface of the first light-guide layer, the light entering the light incident surface outputs from the light emission surface, wherein an angle is formed between the light incident surface and the light emission surface;
    a micro-structured layer formed on one surface of the second light-guide layer and one side opposite to the light emission surface, and a third optical path is formed as the light along the first optical path enters the micro-structured layer;
    wherein, when the second optical path passes through the first light-guide layer and the second light-guide layer, a first interface critical angle ($\theta_{C12}$) with respect to a normal line of the first light-guide layer is formed, and the first interface critical angle is:

$$\theta_{C12} = \sin^{-1}\left(\frac{n_1}{n_2}\right);$$

when the light along the second optical path passes through first light-guide layer, a first critical angle ($\theta_{C1}$) with respect to the normal line of the first light-guide layer is formed, and the first critical angle is:

$$\theta_{C1} = \sin^{-1}\left(\frac{1}{n_1}\right);$$

and the first interface critical angle and the first critical angle are fulfilled with:

$$0 < |\theta_{C12} - \theta_{C1}| \leq 35°$$

wherein, the light propagates along the second optical path and the third optical path and outputs through the light emission surface.

2. The apparatus of claim 1, wherein an average thickness of the micro-structured layer of the second light-guide layer is bigger than the thickness of the first light-guide layer.

3. The apparatus of claim 1, wherein a thickness ratio between the first light-guide layer and the second light-guide layer falls within 0.01 to 1.

4. The apparatus of claim 1, wherein a difference between the second refractive index and the first refractive index falls within 0.04 and 0.14.

5. A multi-layer light guide apparatus, receiving a light from a light source, and a plurality of optical paths are formed within the multi-layer light guide apparatus, each layer defines a normal line, the apparatus comprising:
    a body, having at least a first light-guide layer, a second light-guide layer, and a third light-guide layer, wherein the first light-guide layer has a first refractive index ($n_1$), the second light-guide layer has a second refractive index ($n_2$), and the third light-guide layer has a third refractive index ($n_3$), wherein the first refractive index is smaller than the second refractive index, and the third refractive index is smaller than the second refractive index;
    a light incident surface, positioned at one side of the body, and the light propagating through the light incident surface, and simultaneously entering the first light-guide layer, the second light-guide layer, and the third light-guide layer, and a first optical path and a second optical path are formed;
    a light emission surface being one surface of the first light-guide layer of the body, and the light outputs from the light emission surface as meeting the light incident surface, and the interface of the light incident surface and the light emission surface forms an angle;
    a micro-structured layer formed at one surface of the third light-guide and a side opposite to the light emission surface, wherein the light along the first optical path propagates to the micro-structured layer and forms a third optical path;
    wherein the light along the second optical path propagates through the second light-guide layer and the third light-guide layer, and forms a second interface critical angle ($\theta_{C23}$) with respect to the normal line of the third light-guide layer, and when the light along the second optical path propagates through the second light-guide layer and the third light-guide layer, the second interface critical angle is:

$$\theta_{C23} = \sin^{-1}\left(\frac{n_2}{n_3}\right);$$

when the light along the second optical path propagates through the first lightguide layer and the second light-guide layer, and a first interface critical angle ($\theta_{C12}$) is formed with respect to the normal line of the second light-guide layer, the first interface critical angle is:

$$\theta_{C12} = \sin^{-1}\left(\frac{n_1}{n_2}\right);$$

when the light along the second optical path propagates through the first light-guide layer, and a first critical angle ($\theta_{C1}$) is formed with respect to the normal line of the first light-guide layer, the first critical angle is:

$$\theta_{C1} = \sin^{-1}\left(\frac{1}{n_1}\right);$$

wherein the first critical angle, the first interface critical angle and the second interface critical angle are fulfilled with:

$\theta_{C23} > \theta_{C12}$; $0 < |\theta_{C12} - \theta_{C1}| \leq 35°$;

and the light emission surface receives the light from the second optical path and the third optical path, and outputs the light.

6. The apparatus of claim 5, wherein an average thickness of the second light-guide layer with the micro-structured layer is bigger than the thickness of the first light-guide layer.

7. The apparatus of claim 5, wherein an average thickness of the third light-guide layer is smaller than the average thickness of the second light-guide layer.

8. The apparatus of claim 5, wherein a ratio of the first light-guide layer and the second light-guide layer falls within 0.01 to 1.

9. The apparatus of claim 5, wherein a difference between the second refractive index and the first refractive index falls within 0.04 to 0.14.

10. The apparatus of claim 5, wherein a difference between the third refractive index and the second refractive index falls within 0.02 to 0.1.

* * * * *